United States Patent [19]

Uccello

[11] 4,053,246

[45] Oct. 11, 1977

[54] STORAGE RACK ASSEMBLY AND MOUNTING CLAMP THEREFOR

[75] Inventor: Salvatore A. Uccello, East Hartford, Conn.

[73] Assignee: Lok-Rak Corporation of America, East Hartford, Conn.

[21] Appl. No.: 663,452

[22] Filed: Mar. 3, 1976

[51] Int. Cl.² .............................................. A47F 5/00
[52] U.S. Cl. .................................. 403/233; 211/182; 211/183; 403/316
[58] Field of Search ............... 211/182, 183, 193, 186, 211/191; 403/223, 199, 234, 235, 237; 248/218.4, 219.4, 226.3, 226.5

[56] References Cited

U.S. PATENT DOCUMENTS

| 657,923 | 9/1900 | Escher | 211/183 X |
| 2,765,087 | 10/1956 | Weinbaum | 211/182 X |
| 3,606,028 | 9/1971 | Klein | 211/191 |

Primary Examiner—Roy D. Frazier
Assistant Examiner—Robert W. Gibson, Jr.

[57] ABSTRACT

A storage rack assembly comprises laterally spaced vertical units defining a storage area therebetween and each having a base provided by a W-configured truss and three co-planar posts secured to and extending upwardly from the top of the truss. Spacers maintain the posts in fixed relationship within each vertical unit. Spreaders and shelving members extending between the vertical units are secured to sleeves which in turn are detachably secured to the posts thereof in tightly fitting engagement therewith. Each sleeve comprises a pair of interfitting sections having interfitting oppositely dispoed L-shaped fingers along the vertical edges thereof. Resiliently deformable S-configured clamping members each have offset hook portions which engage recesses in the bases of each pair of interfitting fingers to prevent inadvertent disassembly of the sleeve sections.

2 Claims, 12 Drawing Figures

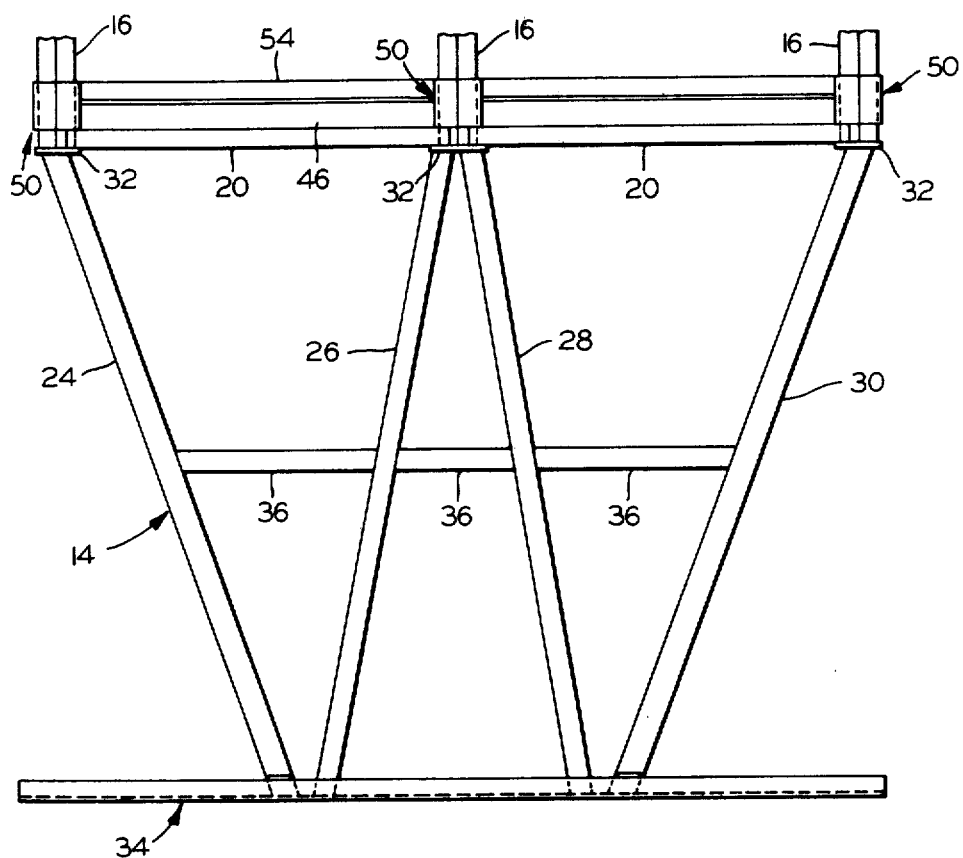
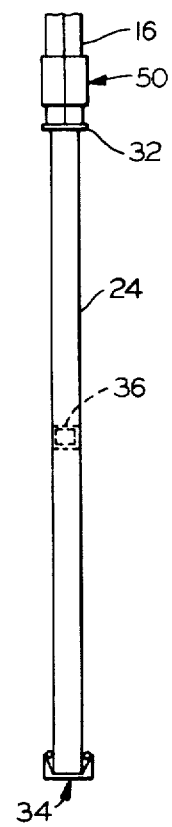
FIG.6  FIG.7
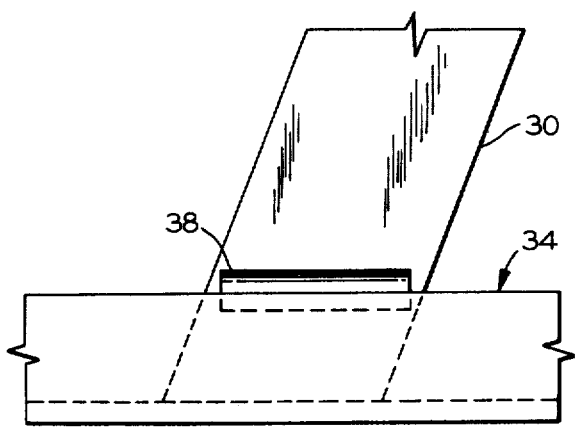
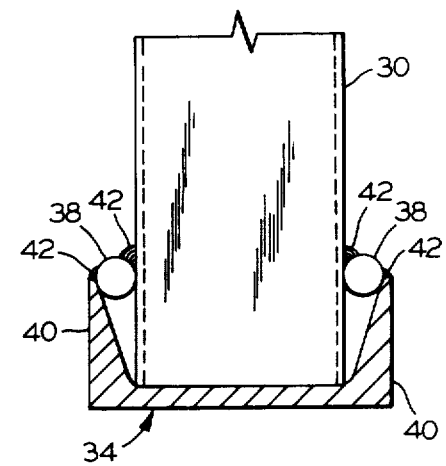
FIG.8  FIG.9 under the page number 4,053,246

STORAGE RACK ASSEMBLY AND MOUNTING CLAMP THEREFOR

BACKGROUND OF THE INVENTION

Storage racks for large units of material in crates or on pallets are well known and generally comprise a multiplicity of vertical posts interconnected by horizontal spacers and/or shelves. To facilitate handling of pallets by fork lift trucks, special storage racks have been proposed such as that shown in U.S. Pat. No. 3,785,502 granted to A. N. Konstant on Jan. 15, 1974. In the storage rack of this patent, the front posts terminate above the floor and diagonal members extend downwardly therefrom. Although this structure has proven advantageous in permitting ready access and minimizing fork lift truck damage, it provides unequal distribution of the vertical loads in this front section of the rack.

In storage racks horizontal members such as shelves are often permanently secured to posts, thus rendering assembly quite involved and disassembly difficult. However, horizontal members may also be detachably secured to posts by sleeves as in U.S. Pat. No. 2,765,087 granted to D. L. Weinbaum on Oct. 2, 1956. Although this unit has been employed satisfactorily for many years, there is a possibility that the sleeve sections may disengage if excessive upward forces are extended on the horizontal members during loading and unloading of the sleeves.

Accordingly, it is an object of the present invention to provide a novel storage rack assembly which is economical and easy to manufacture and has a substantially improved load bearing capacity.

It is also an object to provide such an assembly which is easily assembled from, and disassembled into, a plurality of planar vertical units and horizontal members.

Another object is to provide such an assembly which has an improved mounting clamp for detachably securing sleeves to posts to support the horizontal members thereon.

SUMMARY OF THE INVENTION

It has now been found that the foregoing and related objects of the present invention are readily attained in a storage rack assembly comprising a pair of laterally spaced vertical units defining a storage area therebetween and each comprising three parallel posts extending in a common vertical plane. Horizontal spacers extend between the posts in each common plane to maintain the posts in fixed spaced relationship. A truss comprising four diagonal struts secured in a generally W-configuration provides three terminal portions at the upper end thereof each secured to the lower end of one of the posts. The vertical units are maintained in laterally spaced relationship by securing the lower ends thereof to horizontal support surfaces and by a spreader extending between posts in each vertical unit. Horizontal braces extend between and are secured to the struts in each truss.

Vertically spaced shelves are provided by pairs of support members lying in a common horizontal plane, the support members each having one end secured to one of the vertical units and being spaced apart horizontally to provide a vertically extending passage within the storage area.

The lower ends of the struts are secured to a horizontal support surface by a pair of laterally spaced generally U-shaped elongated channel members each comprising a web and pair of legs. The web is secured to a horizontal support surface with the legs extending upwardly therefrom, the lower ends of the struts being disposed intermediate the legs and secured to the channel members.

The posts preferably have a polygonal cross section with the shelves or any other horizontal member being secured to a multiplicity of sleeves having an internal cross section complementary to the cross section of the posts, each sleeve being detachably secured to one of the posts in tightly fitting engagement therewith. Each sleeve comprises a pair of interfitting sections and a multiplicity of resiliently deformable S-configured clamping members each clamping the sections of a sleeve in interfitting assembly about a post.

Each of the sleeve sections has two horizontal and two vertical edges, a generally L-shaped finger along each of the vertical edges and a recess along the base portion of each finger. The fingers on the section are oppositely disposed and interfitted. The clamping members each have hook portions adjacent the ends thereof offset in different planes with one of the hook portions being seated in the recess of one interfitting finger and the other hook portion being seated in the recess of the other interfitting finger to prevent inadvertent disassembly. In a preferred embodiment each sleeve section has two such fingers along each vertical edge thereof, with additional clamping members securing these additional interfitting fingers against disassembly.

BRIEF DESCRIPTION OF THE DRAWINGS

FIG. 6 is a fragmentary side elevational view of the truss portion of the installation and drawn to an enlarged scale relative to FIG. 1;

FIG. 7 is a front elevational view of the truss portion of FIG. 6;

FIG. 8 is a fragmentary side elevational view showing a strut and channel member of the truss portion of FIG. 6 and drawn to an enlarged scale relative thereto;

FIG. 9 is a transverse vertical sectional view of the strut and channel member of FIG. 8;

DETAILED DESCRIPTION OF THE ILLUSTRATED EMBODIMENT

Figure 2:
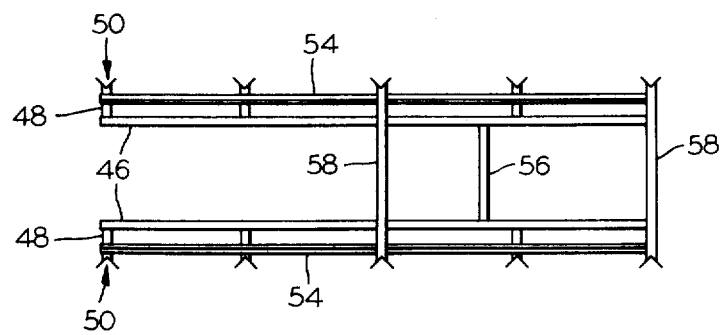
FIG. 2 is a fragmentary plan view of the installation of FIG. 1.
Figure 1:
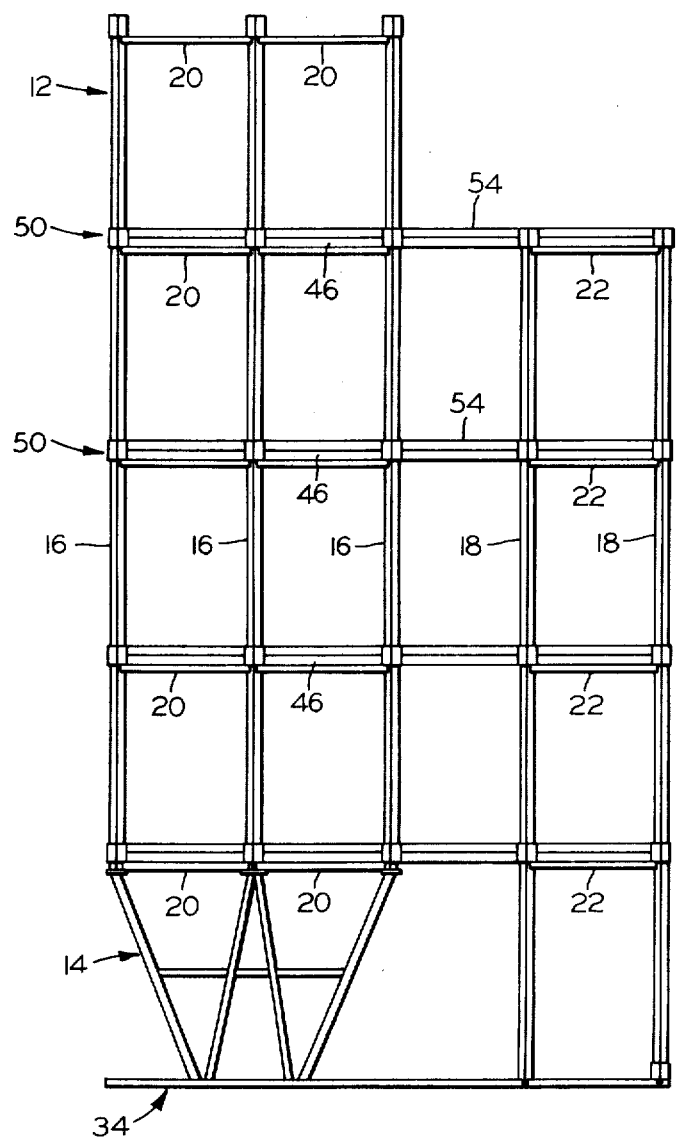
FIG. 1 is a side elevational view of a storage rack installation embodying the present invention.
Figure 3:
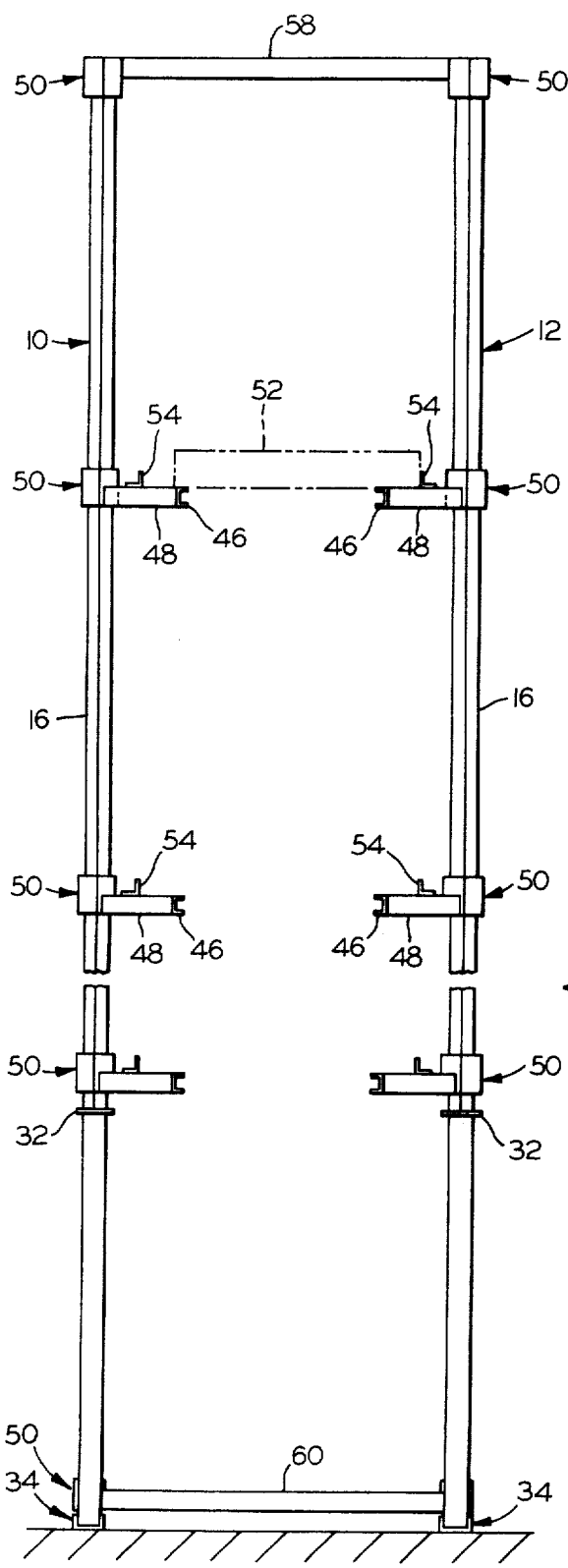
FIG. 3 is a fragmentary front elevational view of the installation of FIG. 1 with a pallet supported thereon shown in phantom line and drawn to an enlarged scale.

Turning now to the attached drawings in detail and in particular to FIGS. 1-3 thereof, illustrated therein is a drive-in storage rack installation embodying the storage rack assembly of the present invention which comprises a pair of laterally spaced vertical units generally designated by the numerals 10, 12 and providing a storage area therebetween. The base portion of each vertical unit 10, 12 is provided by a W-configured truss generally designated by the numeral 14. Extending upwardly from and secured to each truss 14 are three posts 16. Spacers 20, 22 and rails 46 tie the posts 16 together within each vertical unit 10, 12, and spreaders 56, 58 tie the two vertical units 10, 12 together.

Figure 11:
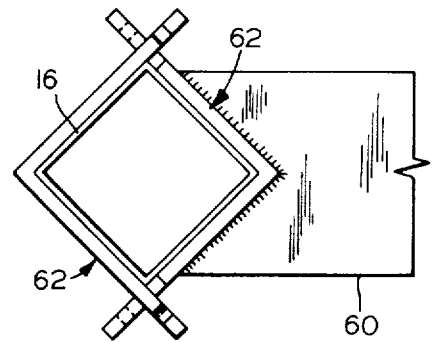
FIG. 11 is a fragmentary horizontal sectional view of the assembly of FIG. 10 without the S-configured clamping member.
Figure 10:
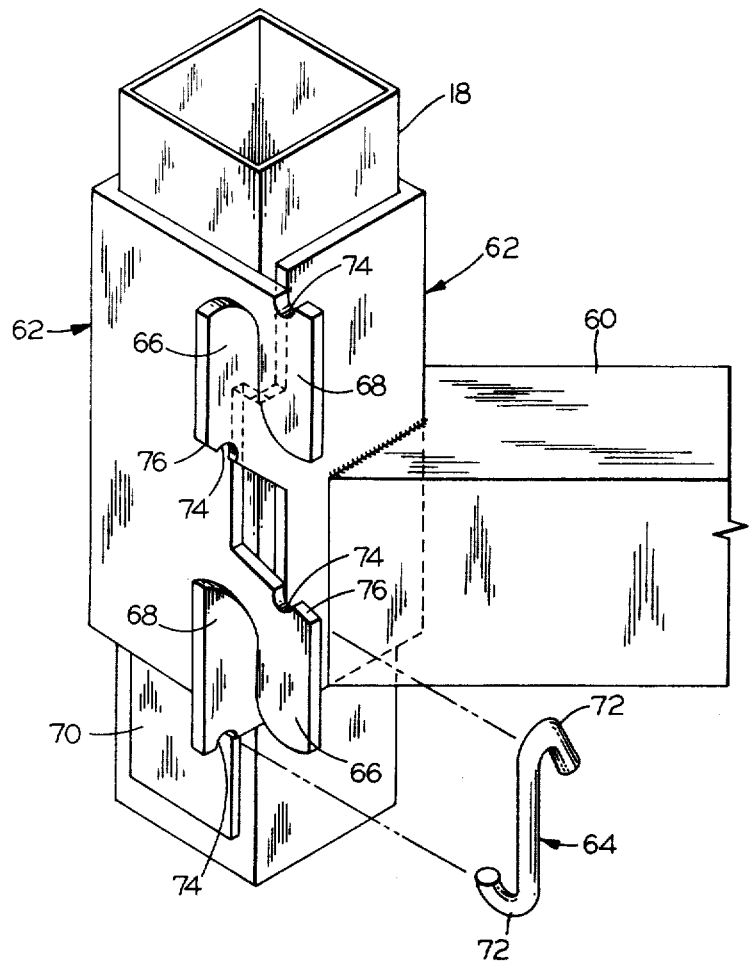
FIG. 10 is a fragmentary partially exploded perspective view of the installation of FIG. 1 showing the mounting clamp assembly for supporting the shelves and drawn to an enlarged scale.
Figure 12:
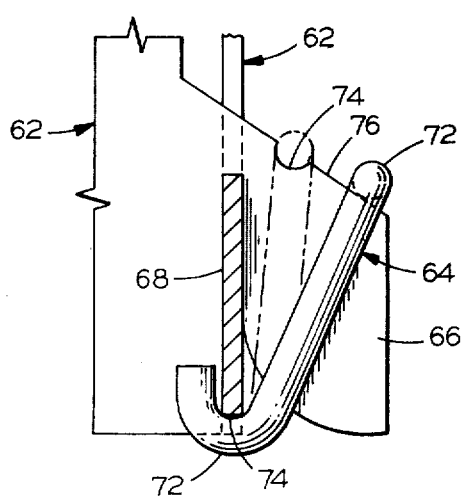
FIG. 12 is a fragmentary side elevational view of the assembly of FIG. 10 showing the clamping member partially seated in full line and locked in phantom line.

The various members extending horizontally between the vertical units 10, 12 are secured to mounting clamp assemblies generally designated by the numeral 50 and best seen in FIGS. 10-12, the mounting clamp assemblies 50 being detachably secured to posts 16, 18. Each mounting clamp assembly 50 comprises a sleeve formed of interfitting sections generally designated by the numerals 62 which are lockably retained in engagement by a multiplicity of S-configured clamping members generally designated by the numeral 64.

Turning first to a description of the vertical units 10, 12, the truss 14 is best seen in FIGS. 6-9 and comprises four diagonal struts 24, 26, 28, 30 arranged in a W-configuration. The lower ends of the struts 24, 26, 28, 30 are welded to the channel members generally designated by the numeral 34 which are normally secured to a floor by bolts or other comparable fasteners (not shown).

Struts 24, 30 are secured to channel members 34 by placing the lower ends thereof between the generally upright legs 40 of the channel members 34, inserting the cylindrical inserts 38, and welding the struts 24, 30 in place as shown at 42. Struts 26, 28 are illustrated as having a smaller width than that of struts 24, 30, and thus inserts 38 are not necessary to facilitate welding; the welds (not shown) are made adjacent the base of the struts 26, 28.

Braces 36 extend horizontally between and are welded to adjacent struts 24, 26, 28, 30 in each truss 14 to provide increased strength.

The upper ends of each of the struts 24, 26, 28, 30 are welded to horizontal rectangular plates 32 which tie adjacent struts together and provide a mounting surface to which the lower ends of the posts 16 are welded. The several plates 32 are in turn welded to the lower spacers 20 which tie the entire top portion of the truss together. Within the portion of each vertical unit 10, 12 above the truss, the posts 16 are maintained in parallel disposition by the spacers 20 extending therebetween and welded thereto.

The trusses 14, in addition to providing increased support to the vertical units 10, 12, also provide a recessed portion bordering transverse aisles which reduces the tendency for transport vehicles to damage the installation and also provides increased maneuvering room therefor without loss of storage space.

As best seen in FIG. 1, the depth of the storage area of the installation provided intermediate the vertical units 10, 12 is increased by adding posts 18 to the basic assembly rearwardly of the vertical units 10, 12. The posts 18 extend to floor level and are mounted on the channel members 34 in a manner best seen in FIGS. 4 and 5. Aligned slots 44 in the channel member legs 40 act as keyways for the insertion of the square cross sectional posts 18, two lower longitudinal edge portions thereof fitting within the slots 44. The posts 18 are welded to the channel members 34.

As previously indicated, the posts 16, 18 within each vertical unit 10, 12 are maintained in parallel disposition by the spacers 20, 22. The posts 18 are maintained in parallel relationship with the posts 16 of the corresponding vertical unit 10, 12 by horizontal rails 46 and angle irons 54 extending therebetween and secured to the mounting clamp assembly 50, and the rails 46 also provide vertically spaced shelves for the storage of articles thereon.

As seen best in FIGS. 2 and 3, the rails 46 are secured to the arms 48 which are welded to the mounting clamp assembly 50 which is detachably secured to a post 16, 18, in a manner more fully described hereinafter. Each rail 46 is secured to the free ends of a plurality of horizontal, parallel arms 48 to provide one end of each shelf support within the storage area between the vertical units 10, 12. Each angle iron 54 is secured to the upper surface of the arms 48 inwardly from the free ends thereof in parallel relationship for a purpose to be described hereinafter.

Each pair of rails 46 forming a shelf is horizontally spaced a distance sufficient to provide a drive-in storage bay which permits use of vertically extendable transport vehicles such as fork lift trucks. A pallet 52 is shown in phantom line in FIG. 3 supported upon the rails 46. As can be seen the angle irons 54 extend parallel to the rails 46 and provide retainers to limit lateral movement of the pallets 52 and prevent them from falling between the ends of rails 46.

The upper portions of the vertical units 10, 12 and additional posts 18 are maintained in proper laterally spaced relationship by the spreaders 56, 58 extending the rails 46 and posts 16, 18, respectively. The spreaders 58 are welded to clamp assemblies 50 which are detachably secured to posts 16, 18. The lower portions of the vertical units 10, 12 and associated posts 18 are maintained at the proper spacing by being secured to the parallel channel members 34 as described hereinbefore. A spreader 60 extends between the lower portions of two posts 18 and represents a limit for the motion of a vehicle into the storage bay. As with spreaders 58, spreader 60 is welded to clamp assemblies 50 which are detachably secured to posts 18.

The mounting clamp assemblies 50 detachably secured to posts 16, 18 to provide means for detachably mounting arms 48 and spreaders 58, 60, are best seen in FIGS. 10-12. Each clamp assembly 50 includes a sleeve comprising a pair of interfitting identical right angle sections 62 and at least one deformable S-configured clamping member 64. The clamp assembly 50 is illustrated as being mounted to a post 18 and has the spreader 58 welded thereto.

Each clamp section 62 has a pair of vertically disposed L-shaped fingers 66, 68 on each vertical edge thereof. The sections 62 are mounted to the post 18 by inverting one section 62 and sliding it into engagement with the other section 62, the fingers 66, 68 of one section interfitting with the fingers 68, 66, respectively, of the other section. As seen the sections 62 should be oriented so that the lowest finger 68 extends upwardly and the uppermost finger 68 extends downwardly. The sleeve is thus mounted to the post 18 in tightly fitting engagement therewith.

Figure 4:
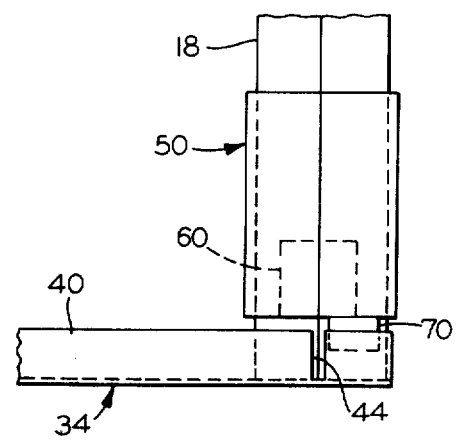
FIG. 4 is a fragmentary side elevational view showing the base of a post mounted on a horizontal channel member and drawn to an enlarged scale relative to FIG. 3.
Figure 5:
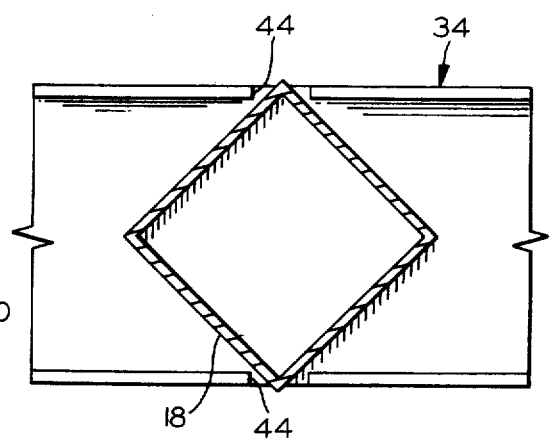
FIG. 5 is a fragmentary horizontal sectional view of the assembly of FIG. 4 to an enlarged scale.

As seen in FIG. 4, a tab 70 is secured to the outer surface of the post 18 and the lower edge of one of the sections 62 of the clamp assembly 50 abuts thereagainst to limit downward movement of the assembly 50 upon the post 18. Alternatively this limitation of downward movement is provided by mounting the clamp assemblies 50 above the abutting horizontal members, such as spacers 20, 22 (see FIG. 1), secured directly to posts 16, 18.

The sections 62 are locked in interfitting engagement by the clamping members 64, which have hook portions 72 at both ends thereof offset in different perpendicular planes and seated in recesses 74 in the base portions of the fingers 66, 68. With reference to FIG. 12, each clamping member 64 is mounted by first seating a hook portion 72 thereof in the recess 74 adjacent the base portion of the finger 68. The other hook portion 72 is forced or driven along the angled edge portion 76 of finger 66 until it seats in the recess 74, as shown in phantom line. This process is repeated at least one pair of interfitting fingers 66, 68 is lockably engaged on each pair of clamp sections 62.

The posts, spacers, spreaders, struts and bars are all preferably formed of hollow, square cross sectional steol tubing for economy and strength although other configurations may be employed. All joints except those involving clamp assemblies to posts are preferably formed by welding, although rivets or bolts may also be used.

The preferred embodiment of installation provides a drive-in storage area, thus requiring some means to maintain the lateral spacing of the upper portions of the veritical units. This may be effected by the illustrated spreaders or by shelves which extend completely between the vertical units. Alternatively the upper ends of the posts may be secured to a ceiling. The lower ends of the struts and additional posts are preferably secured to channel members, although they may be secured directly to a floor.

A multiplicity of interconnected vertical units may be used to provide additional storage space. The depth of the storage area may be further increased by adding more than two posts to each vertical unit.

Thus, it can be seen that the storage rack assembly and mounting clamp therefor of the present invention provide a novel assembly which is economical and easy to manufacture and has a substantially improved load bearing capacity. The assembly is easily assembled from and disassembled into a plurality of vertical units and horizontal members by means of an improved mounting clamp for detachably securing sleeves to posts to support the horizontal members thereon.

Having thus described the invention, I claim:

1. In a mounting clamp assembly for detachably securing horizontal members to posts, the combination comprising a post having a polygonal cross section, a sleeve having an internal cross section complementary to said cross section of said post and detachably secured to said post in tightly fitting engagement therewith, a horizontal member secured to said sleeve, a projection on said post below said sleeve preventing downward displacement of said sleeve, and a plurality of resiliently deformable S-configured clamping members, said sleeve comprising a pair of interfitting sections each having two horizontal and two vertical edges, a generally L-shaped finger along each of said vertical edges and a recess along the base portion of said fingers, said fingers on said sections being oppositely disposed and interfitting, said clamping members each having hook portions adjacent the ends thereof offset in different planes with one of said hook portions being seated in the recess of one interfitting finger and the other of said hook portions being seated in the recess of the other interfitting finger to prevent inadvertent disassembly.

2. The mounting clamp assembly of claim 1 wherein each of said sleeve section vertical edges has a second generally L-shaped finger thereon projecting in the same direction as said first mentioned finger and a recess along the base portion of said second fingers.

* * * * *